Oct. 2, 1928.

H. P. ARNT 1,685,832

METHOD OF MAKING REENFORCED TUBULAR SPOKES

Filed April 26, 1926

Inventor
Herald P. Arnt
By Curt B. Muller,
Attorney

Patented Oct. 2, 1928.

1,685,832

UNITED STATES PATENT OFFICE.

HERALD P. ARNT, OF JACKSON, MICHIGAN.

METHOD OF MAKING REENFORCED TUBULAR SPOKES.

Application filed April 26, 1926. Serial No. 104,642.

My invention pertains to a method of making a reenforced tubular metal spoke, and more particularly to an alternative method for realizing some of the advantages of my two copending applications both filed April 11, 1923, Serial Nos. 631,326 and 631,327, while also embodying some principles of my joint application with E. J. Arnold filed April 15, 1924, Serial No. 706,679.

It is to be realized that the scope of my invention comprehends some changes in practicing the method. The showing of the drawings and the particular description are merely a specific exemplification.

Figure 1:
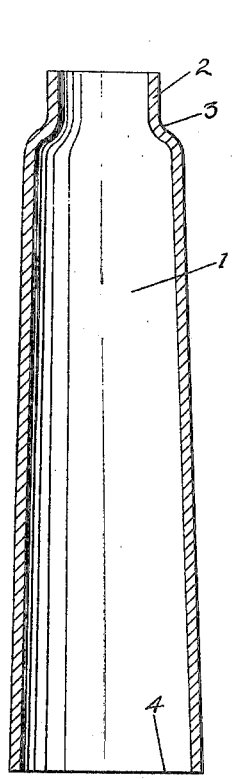
Fig. 1 is a longitudinal diametrical section of the longer outer tubular end section constituting one complemental spoke part.
Figure 2:
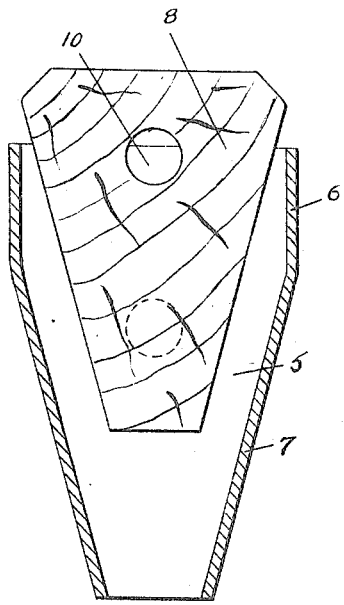
Fig. 2 is a corresponding sectional view of a nave end section preparatory to use according to my invention.

The elongated outer section 1 may be either drawn or formed from a blank or blanks and welded. Preferably, the outer end 1 is round in cross-section and a very gradual taper toward the end with a tenon 2 of reduced size at its outer extremity, the surface of which tenon merges with an interjacent fillet surface 3. The larger end of the spoke section 1 terminates as an annular edge 4.

A nave section 5 has a larger quadrilateral end 6 from which continues an extension of progressively reduced size by reason of two converging sides 7. The progressively smaller end of the nave section 5 happens to be exemplified as of frusto-wedge-shaped form, the two other oppositely disposed sides of it (not illustrated) being parallel. It should be understood that the nave section 5, in its entirety, may likewise be either drawn from a blank and then its closed end severed, or it may be formed from one or two blanks and welded.

Figure 3:
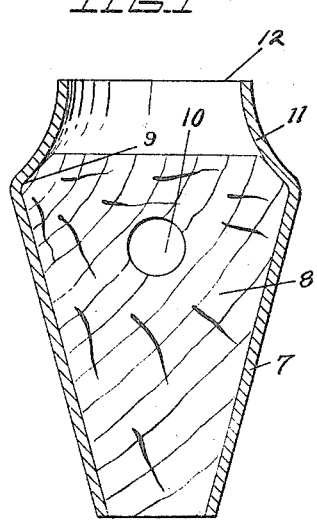
Fig. 3 is a view of the nave end section showing a filler fitted therein and the larger end of the nave section modified.

A frusto-wedge shaped, hence varisized reenforcing filler 8, exemplified as composed of solid wood, is next fitted into the nave section 5, as appears in Fig. 3. It will be observed that the filler 8 is somewhat longer than the frusto-wedge-shaped end, and is fashioned with a pair of converging sides 9 which are initially disposed in the larger end 6. A hole 10 is provided in the filler through which a hub clamping bolt is to pass. After the filler has been inserted the larger end 6 is modified by constricting it by a swaging or other appropriate operation which causes portions 11 of the end 6 to conform to and abut the surface 9 of the filler which thereby becomes locked in place. It is to be noticed that the operation of modifying the end 6 additionally so forms it that it presents exteriorly and all around it a concave surface which becomes progressively altered from quadrilateral shape to circular shape and, in fact, so that it terminates as a round edge 12 corresponding in size to the edge 4.

Figure 4:
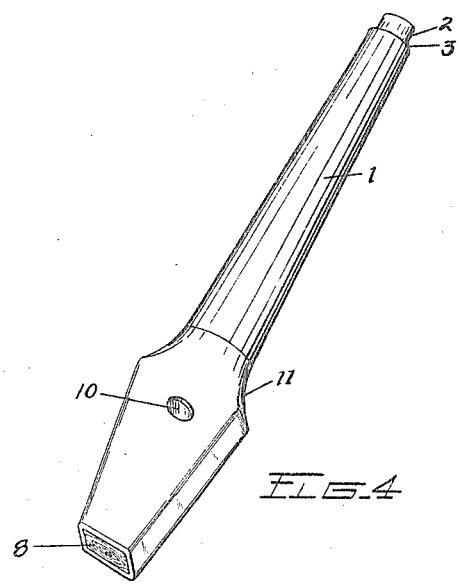
Fig. 4 is a perspective view of the completed spoke.

The succeeding operation is effecting a welded connection, according to any one of several feasible practices, as between the edges 4 and 12. Finally, the exterior burr may be ground off so that the final product appears as shown in Fig. 4.

The advantages of making a tubular metal spoke as described are as follows:

The two parts or sections of the spoke can be produced or drawn at less cost than a metal spoke made from a single blank and drawn its entire length.

It permits of inserting wedge-shaped filler through upper opening of nave section and by constricting or reducing this section to its conventional proportions, forces the wedge to a seat in the nave end of the spoke thus preventing movement or shifting of said wedge or filler in any direction.

The burr or fin which is the result of welding the two halves together can be very quickly and cheaply removed by placing the spoke in a suitable holder of a jig and turning or rotating it against a cutting tool constructed for the purpose.

The cheapest wooden spoke costs about five cents, so that any saving in spoke cost is to be multiplied by twelve for a wheel and by forty-eight for a set of wheels. I have learned that my tubular steel spoke, of which only ten instead of twelve for each wheel are required, can be manufactured for less than five cents involving therefore a saving of forty or more cents per set which can amount to an enormous aggregate saving.

I claim:

1. The method of making a reenforced tubular metal spoke which consists in forming a hollow quadrilateral nave end with portions of a pair of opposite sides converging, inserting a wedge-shaped filler, modifying the larger end of said nave end, and then welding thereto a tubular extension.

2. The method of making a reenforced tubular metal spoke which consists in forming a hollow quadrilateral nave end with portions of a pair of opposite sides converging, inserting a frusto-wedge-shaped filler. constricting the larger end of said nave end partially across the near end of said filler, and finally welding one end of a tubular extension to the edge of said constricted portion.

3. The method of making a nave-end-reenforced tubular metal spoke which consists in forming a hollow polygonal nave section of progressively reduced compass toward one of its ends, inserting a polygonal filler shaped to fit in part of said nave section, constricting the larger end of said nave end against two sides of said filler and so that its edge is a closed curve, and finally welding a correspondingly shaped end of a tubular extension to the edge of said constricted portion.

4. The method of making a reenforced tubular metal spoke which consists in fitting a frusto-wedge-shaped filler into a frusto-wedge-shaped nave portion by insertion through a larger end, modifying said larger end and then welding to said modified end of the nave portion a conforming edge of an elongated mainly curved complemental spoke portion.

5. The method of making a reenforced tubular metal spoke, which consists in providing two metallic tubular, longitudinal end sections, inserting a reenforcing element into one of said sections and welding together edge portions of said sections along an intermediate spoke enveloping line which is of smaller compass than a cross sectional compass of said element whereby the latter has one end surface partially confined.

6. The method of making a reenforced tubular metal spoke, which consists in providing a metallic tubular nave section larger at one end, introducing a correspondingly shaped reenforcing element into the larger end of said nave section until fitted therein and then welding a complementary tubular section to an edge portion of said nave section along an intermediate spoke enveloping line which is of smaller compass than a cross sectional compass of the larger end of said element whereby the latter is locked in place.

7. The method of making a reenforced tubular metal spoke, which consists in forming a nave portion to tubular shape, inserting a reenforcing element, modifying said nave end to prevent displacement of said inserted element and then attaching a tubular extension to one end of said nave portion.

8. The method of making a reenforced tubular metal spoke, which consists in forming a nave portion to tubular shape, inserting a reenforcing element, modifying said nave end to prevent relative movement between it and said inserted element, and then welding a complementary tubular spoke portion to one end of said nave portion.

9. The method of making a reenforced tubular metal spoke, which consists in forming a nave section to tubular shape, causing a reenforcing element to occupy only a portion of said nave section, modifying the unoccupied portion of said nave end to prevent displacement of said inserted element and then welding a tubular extension to the modified end of said nave portion.

10. The method of making a reenforced tubular metal spoke which consists in inserting as far as possible into a larger open end of one of two complementary tubular parts a filler too large entirely to be passed therethrough, modifying said tubular part to secure said filler against endwise displacement and then attaching to said modified end a tubular extension.

11. The method of making a reenforced tubular metal spoke which consists in fitting a preformed varisized filler into the larger of two open ends of a tubular nave part, adapted to constitute one end of the entire spoke, until said filler becomes seated therein, modifying said larger end of the nave part to secure said filler against endwise displacement and then welding one end of a tubular extension to said modified end.

12. The method of making a reenforced tubular metal spoke which consists in providing two complemental tubular end sections including endless edges, fitting only one end of a reenforcing element in only one end of one of said sections by insertion of said element through a larger end opening of such spoke section and then securing to the endless edge of the other part of said tubular spoke section an endless edge of the other complemental spoke section.

13. The method of making a reenforced tubular metal spoke which consists in providing two complementary end to end tubular spoke sections each of which is larger at one end, fitting one end part of a reenforcing element into one end of one of said tubular sections by insertion through the larger end thereof, said element having its other end differently shaped than said larger end of the section it occupies, reforming said larger end to conform to said other end of the element and then welding to the defining edge of said larger end an edge of the other spoke section.

14. The method of making a reenforced tubular metal spoke which consists in fitting a correspondingly shaped smaller end portion of a filler into a partially wedge-shaped nave portion constituting one of two tubular complementary end to end spoke end sections by insertion through a larger end of said nave portion, the larger portion of said filler having a varisized shape desired for the unfitted nave section, constricting said unfilled nave section to correspond to and snugly enclose a section of the larger portion of said filler and then welding a conforming edge of the other spoke portion to the reformed edge of said nave portion.

Signed by me, this 24th day of March, 1926.

HERALD P. ARNT.